310-14 SR
6/30/87 XR 4,677,327

United States Patent [19]

Kushida et al.

[11] Patent Number: 4,677,327

[45] Date of Patent: Jun. 30, 1987

[54] ELECTROMAGNETIC ACTUATOR WITH CONCENTRIC COIL RESIN FILL

[75] Inventors: Takeo Kushida, Higashi-Matsuyama; Youichi Taniai, Tokyo, both of Japan

[73] Assignees: Diesel Kiki Co., Ltd.; Sanken Airpax Co., Ltd., both of Tokyo, Japan

[21] Appl. No.: 831,444

[22] Filed: Feb. 20, 1986

[30] Foreign Application Priority Data

Feb. 27, 1985 [JP] Japan .................................. 60-38412

[51] Int. Cl.$^4$ ........................ B29C 45/00; H02K 1/18

[52] U.S. Cl. ................................ 310/43; 251/129.16; 264/272.15; 335/282; 336/205; 310/14

[58] Field of Search ...................... 264/272.14, 272.15, 264/272.19, 272.2; 251/129.16; 310/15, 28, 29, 32, 35, 12, 14, 42, 43, 87; 335/281, 282, 255; 336/96, 205, 232

[56] References Cited

U.S. PATENT DOCUMENTS 3,001,757 9/1961 Ball ................................ 251/129.16
3,084,418 4/1963 Procopio .......................... 310/43 X
3,638,055 1/1972 Zimmermann ........................ 310/43
4,357,292 11/1982 Myers ................................ 264/137
4,470,786 9/1984 Sano et al. ....................... 264/272.15

FOREIGN PATENT DOCUMENTS 53-120017 10/1978 Japan .
2045177 10/1980 United Kingdom ........... 251/129.16

*Primary Examiner*—Patrick R. Salce
*Assistant Examiner*—D. L. Rebsch
*Attorney, Agent, or Firm*—Wendertoh, Lind & Ponack

[57] ABSTRACT

An electromagnetic actuator including a stator and an armature having opposed flat faces which are movable relative to each other, grooves formed in the flat face of the stator facing the flat face of the armature, with endless coils received in the grooves, and bore hole formed in the stator for fluid communication between the grooves, for allowing resin to be poured in the bore hole and thus fill the grooves with the endless coils therein.

14 Claims, 3 Drawing Figures

ELECTROMAGNETIC ACTUATOR WITH CONCENTRIC COIL RESIN FILL

BACKGROUND OF THE INVENTION

1. Field of the Invention

The present invention relates generally to an electromagnetic force-operable electromagnetic actuator and, more particularly, to an electromagnetic actuator of the type which is used as the electromagnetic valve for controlling the opening or closing of, e.g., a fuel jetting valve.

2.Description of the Prior Art

For instance, Japanase Patent Laid-open Publication No. 53 (1978)-120017 discloses such a type of electromagnetic actuator in which an armature and a stator, each in the form of a flat plate, are arranged in face-to-face relation. A plurality of endless coils are disposed on the surface of the stator facing the armature, and currents are passed through the adjacent coils in the opposite direction, thereby to form an efficient magnetic circuit which is operable at a high speed. The aforesaid plurality of coils are fixedly received in grooves formed in the stator.

With reference to such an electromagnetic actuator, however, when resin is poured in the coil-containing grooves for fixation of the coils therein, as is conventionally done, there is a problem that, since such grooves are independently provided, separate pouring of the resin therein is troublesome and time-consuming.

SUMMARY OF THE INVENTION

An object of the present invention is to provide an electromagnetic actuator which dispenses with such troublesome and time-consuming work as mentioned above, and allows easy assembling of coils.

Another object of the present invention is to provide an electromagnetic actuator which assures fixation of coils and thereby prevents incidental removal thereof.

A further object of the present invention is to provide a method for producing an electromagnetic actuator which permits easy assembling of coils.

According to a first aspect to the present invention, there is provided an electromagnetic actuator including a pair of members having opposed flat faces which are movable relative to each other, a plurality of grooves formed concentrically in the flat face of one of said members opposite to the face of the other members for receiving a plurality of endless coils, and a plurality of endless coils received in said plurality of grooves, which further includes an inlet part and a bore hole formed in one of said pair of members to allow fluid communication between said grooves and said inlet port for filling resin in said grooves, and resin integrally filled in between said plurality of coils and said plurality of grooves in said bore hole.

According to a second aspect of the present invention, there is provided a method for producing an electromagnetic actuator which includes a pair of members having opposed opposite flat faces which are movable relative to each other, a plurality of grooves formed concentrically in the flat face of one of said members opposite to the face of the other member for receiving a plurality of endless coils, and a plurality of endless coils received in said plurality of grooves, and further includes an inlet port, a bore hole extending from the inlet port formed in one of said pairs of members to allow fluid communication between all of said grooves and said inlet port for filling resin into said grooves, and resin integrally filled in between said plurality of coils and said plurality of grooves and in said bore hole, wherein;

(a) a mold having a projection is placed on the upper portion of said coil-receiving grooves, and resin is poured into said inlet port, and (b) the projection of said mold is engaged with said plurality of coils to keep them in place while the resin hardens in said grooves.

It is appreciated that additional features and advantages of the present invention may easily be achieved by those skilled in the art in the light of the following detailed description.

It is also appreciated that the accompanying drawings showing the embodiments including the principle of the present invention are given for the purpose of illustration alone.

DETAILED DESCRIPTION OF THE PREFERRED EMBODIMENTS

Figure 1:
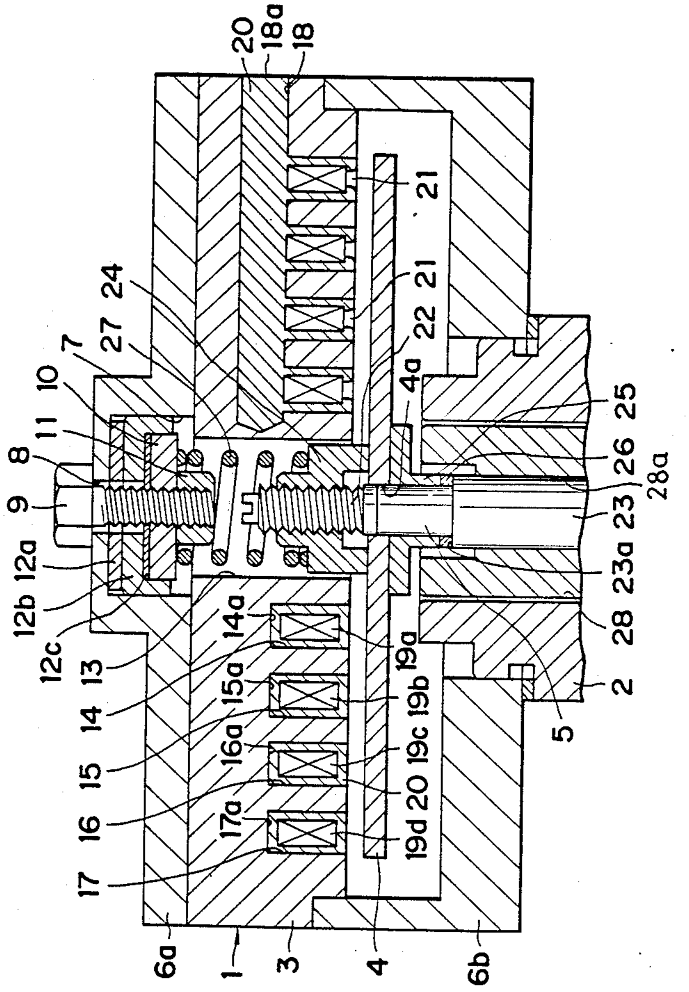
FIG. 1 is a sectional view showing the electromagnetic actuator according to the present invention.

Referring now to FIG. 1, an electromagnetic actuator 1 forms an electromagnetic valve mounted to a fuel jetting device 2.

The actuator 1 includes a pair of members comprising a stator 3 formed of a magnetic material and an armature 4 movable towards and away from the stator 3 again formed of a magnetic material, and is positioned with a flat face of the stator 3 being opposite to and facing a flat face of the armature 4. The armature 4 is fixedly attached to an output shaft 5 which extends perpendicularly in an axial direction from the armature 4.

The stator 3 is fixed or secured to upper and lower housings 6*a* and 6*b* by coupling the upper housing 6*a* onto an upper face of the stator 3 and coupling the lower housing 6*b* to a coupling step formed on the peripheral edge of the lower face of the stator 3.

In the central portion of the upper housing 6*a*, there is formed a recess 7 including a threaded insertion hole 8 through which a bolt 9 is inserted. An upper spring bearing 10 is screwed onto the bolt 9 within the recess 7 by means of a nut 11, and spacers 12*a*–12*c* are interposed between the upper spring bearing 10 and the bottom of the recess 7.

The stator 3 includes an axially extending center hole 13 therethrough, around which, for instance, four (4) coil-receiving grooves 14–17 are concentrically formed in the lower surface of th stator 3, the grooves being coaxial with an axis extending perpendicularly to the lower surface. The stator 3 also includes a radially extending bore hole 18 which intersects an axial end 14*a*–17*a* of each groove 14–17 to provide fluid communication between the grooves 14–17 at the bottoms 14*a*–17*a*, thereof said bore hole being open on the radially outer peripheral surface of the stator 3, form an inlet port 18*a* for filling resin into the grooves 14–17.

Figure 2:
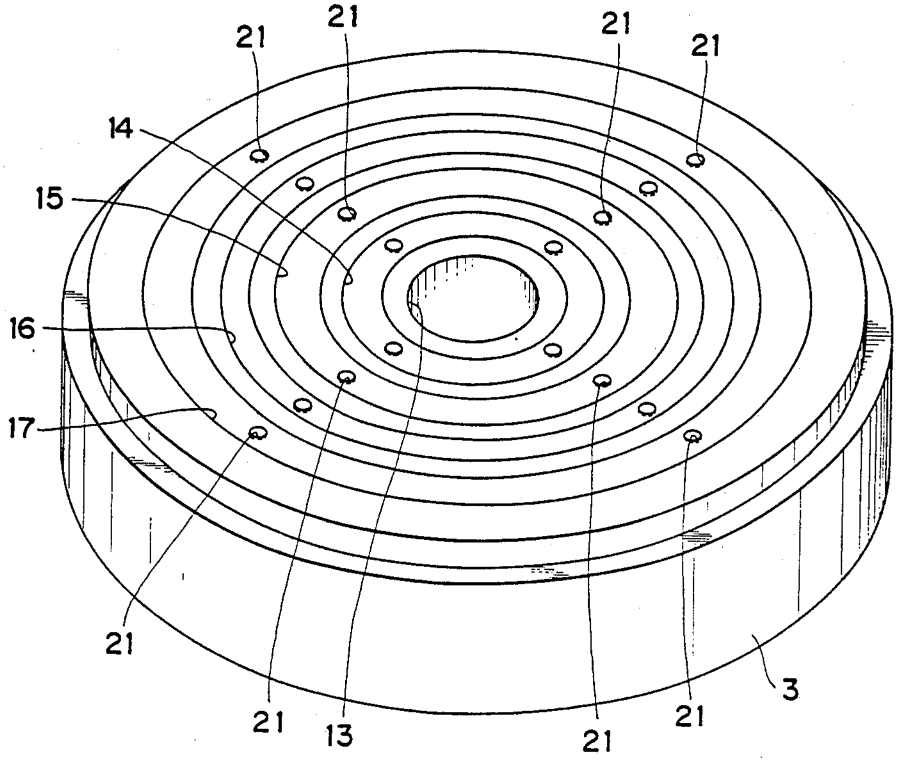
FIG. 2 is a perspective view illustrating the stator used with that actuator.

The grooves 14–17 each receive air-core coils 19*a*–19*d*. A resin 20 is integrally poured in between the coils 19_a_–19_d_ and the grooves 14–17 and in the bore hole 18. A part of the resin 20 filled in between the open faces of the coil-receiving grooves 14–17 and the coils 19_a_–19_d_ is formed with an indentation 21 which extends from a respective coil to a plane defined by the face of the armature 4 resulting from pouring of resin, as will be described later (see FIG. 2).

It is understood that the coils 19_a_–19_d_ are connected in series with one another, and are arranged such that the winding directions of the adjacent coils are reversed to reverse the directions of flow of current passing therethrough.

The armature 4 biased away from the stator 3 by spring means and includes therein a center through-hole 4_a_, into which the output shaft 5 is inserted. The output shaft 5 is formed with an externally threaded portion 22 at one end and a valve head portion (not shown) at the other end, which is not illustrated. Between the valve head portion and the externally threaded portion 22, a portion 23 of the shaft 5 having an increased diameter is slidably moved in a sliding hole 28_a_ in a valve seat member 28 for guiding the shaft 5 in the axial direction.

The externally threaded portion 22 faces the center hole 13 in the stator 3, and is in threaded engagement with a keep member 24. The armature 4 is then tightly clamped between the keep member 24 and a receptacle member 25.

The receptacle member 25 is fitted around the output shaft 5 and is locked onto one end face 23_a_ of the increased-diameter portion 23 of the shaft 5. Between the upper spring bearing 10 and the keep member 24, the spring means comprising a spring 27 is resiliently interposed in the center hole 13 in the stator 3 to urge the armature 4 and the output shaft 5 downwardly away from the stator 3.

The fuel jetting device 2 is placed on the lower portion of the lower housing 6_b_, and is provided with the valve seat member 28, through the sliding hole 28_a_ in which, as already mentioned, there is slidably inserted the increased-diameter portion 23 of the shaft 5 which extends in the axial direction. At the lower portion of the valve seat member 28 which is not shown, the valve head portion (not shown) formed at one end of the shaft 5 is moved for seating on, or away from, the valve seat member 28 by up or down movement of the shaft 5 towards and away from the stator 5.

Figure 3:
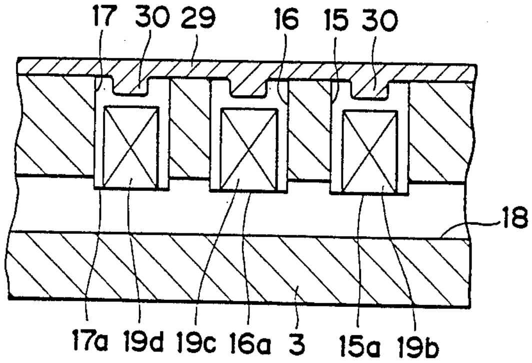
FIG. 3 is a partly sectioned view illustrative of the engagement of that stator with the mold.

In order to fix the coils 19_a_–19_d_ in place when resin is poured or filled in the stator 3, the coils 19_a_–19_d_ are initially positioned in the grooves 14–17 formed in the stator 3, and the open faces of the grooves 14–17 are then covered with a mold 29, as illustrated in FIG. 3.

The mold 29 is provided with a plurality of projections 30 located at the positions corresponding to the grooves 14–17, said projections extending from the open faces of the grooves 14–17 into the grooves 14–17.

Subsequently, an amount of resin is poured or filled into the inlet port 18_a_ in the bore hole 18 to thereby fill said resin in said hole 18 and in between the grooves 14–17 and the coils 19_a_–19_d_. At the same time, the coils 19_a_–19_d_ are forced up or ejected toward the open faces of the grooves 14–17 due to the pressure pouring of the resin forced into the grooves. However, since the coils 19_a_–19_d_ are retained in the grooves 14–17 by the projections 30, the resin filling operation is finished before the coils reach the open faces of the grooves 14–17. Finally, the mold 29 is removed (see FIG. 2). In the vicinity of the aforesaid open faces of the grooves, the resin is formed with indentations 21 at locations which coincided with the projections 30 of the mold 29 but as can be seen from FIG. 3 the resin completely surrounds the endless coils 19_a_, 19_b_, 19_c_ and 19_d_.

With the electromagnetic actuator 1 having stator 3 incorporated therein, excitation of the coils 19_a_–19_d_ causes magnetic flux to be produced around said coils 19_a_–19_d_, whereby the armature 4 is attracted to the stator 3, so that the output shaft 5 is moved upwardly against the action of the spring 27. Subsequent interruption of excitation of the coils 19_a_–19_d_ causes the armature 4 and the output shaft 5 to be moved downwardly away from the stator 3 under the action of the spring 27.

It is noted while the above-mentioned particular embodiment has been described as using one bore hole 18, but a plurality of such bore holes may be provided, and may be used as air ventilation holes during the resin pouring or filling operation. The bore hole or holes may be positioned either radially or diametrically.

The projections 31 formed on the mold 29 are not limited to any given shape and or size. Consequently, use may be made of any projection capable of preventing forcing-up ejection of the coils 19_a_–19_d_ to the open faces of the coil-containing grooves 14–17 due to the pressure of resin pouring.

Evidently many changes and modifications of the present invention may be possible in the light of the foregoing.

It is therefore appreciated that the present invention may be additionally carried out in various forms within the scope of the claims.

What is claimed is:

1. An electromagnetic actuator including a pair of members having opposed flat faces which are movable relative to each other, a plurality of grooves formed concentrically in the flat face of one of said members opposite to the face of the other member for receiving a plurality of endless coils, and a plurality of endless coils received in said plurality of grooves, which further includes an inlet port and at least one bore hole formed in one of said members and intersecting all of said grooves to allow fluid communication between all of said grooves and said inlet port for filling resin into said grooves, and resin integrally filled in between said plurality of coils and said plurality of grooves and in said bore hole.

2. The actuator as defined in claim 1, wherein currents are passed through the adjacent coils of said plurality of coils in opposite directions.

3. The actuator as defined in claim 1, wherein said bore hole is radially formed in one of said members.

4. The actuator as defined in claim 3, wherein one bore hole is provided.

5. The actuator as defined in claim 3, wherein two or more bore holes are provided.

6. An electromagnetic actuator, comprising:

a housing;

first and second members disposed in said housing, each of said members having a flat face facing the flat face of the other one of said members, one of said members being movable with respect to the other one of said members;

a plurality of grooves formed in the flat face of one of said members, said grooves being coaxial with an axis extending perpendicularly to the flat face in which said grooves are formed;

a plurality of endless coils disposed in all of said grooves, said endless coils being adapted for connection to a source of electrical current;

an inlet port extending into said one of said members in which said grooves are formed;

at least one bore hole extending from said inlet port in said one of said members in which said grooves are formed, said bore hole intersecting each of said grooves to allow fluid communication between said inlet port and each of said grooves; and resin filled into said grooves, said bore hole and around said endless coils.

7. The electromagnetic actuator of claim 6, wherein said first member is fixed to said housing and said second member is movable towards and away from said first member, said first and second members being of a magnetic material.

8. The electromagnetic actuator of claim 7, further comprising spring means disposed in said housing for biasing said second member away from said first member.

9. The electromagnetic actuator of claim 7, further comprising a shaft extending from said second member, said shaft being adapted for actuating a valve of a fuel jetting device.

10. The electromagnetic actuator of claim 7, wherein said plurality of grooves are formed in said first member and said bore hole extends radially in said first member.

11. The electromagnetic actuator of claim 6, wherein said at least one bore hole comprises a single bore hole.

12. The electromagnetic actuator of claim 6, wherein said at least one bore hole comprises a plurality of bore holes.

13. The electromagnetic actuator of claim 8, wherein said spring means comprises a spring disposed between said housing and said second member.

14. The electromagnetic actuator of claim 8, wherein at least one indentation is provided in said resin in each of said plurality of grooves, said indentation extending axially from a respective one of said endless coils to a plane defined by said flat face of said one of said members in which said grooves are formed.

* * * * *